July 28, 1925.

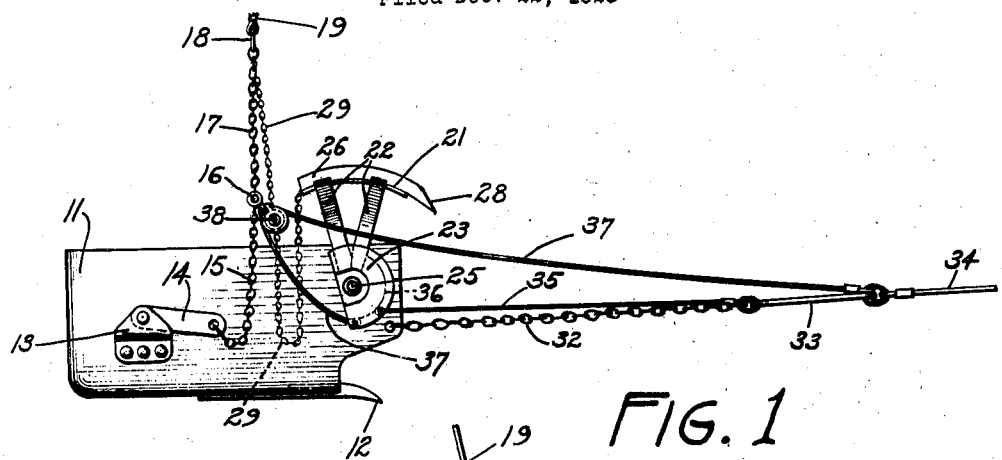
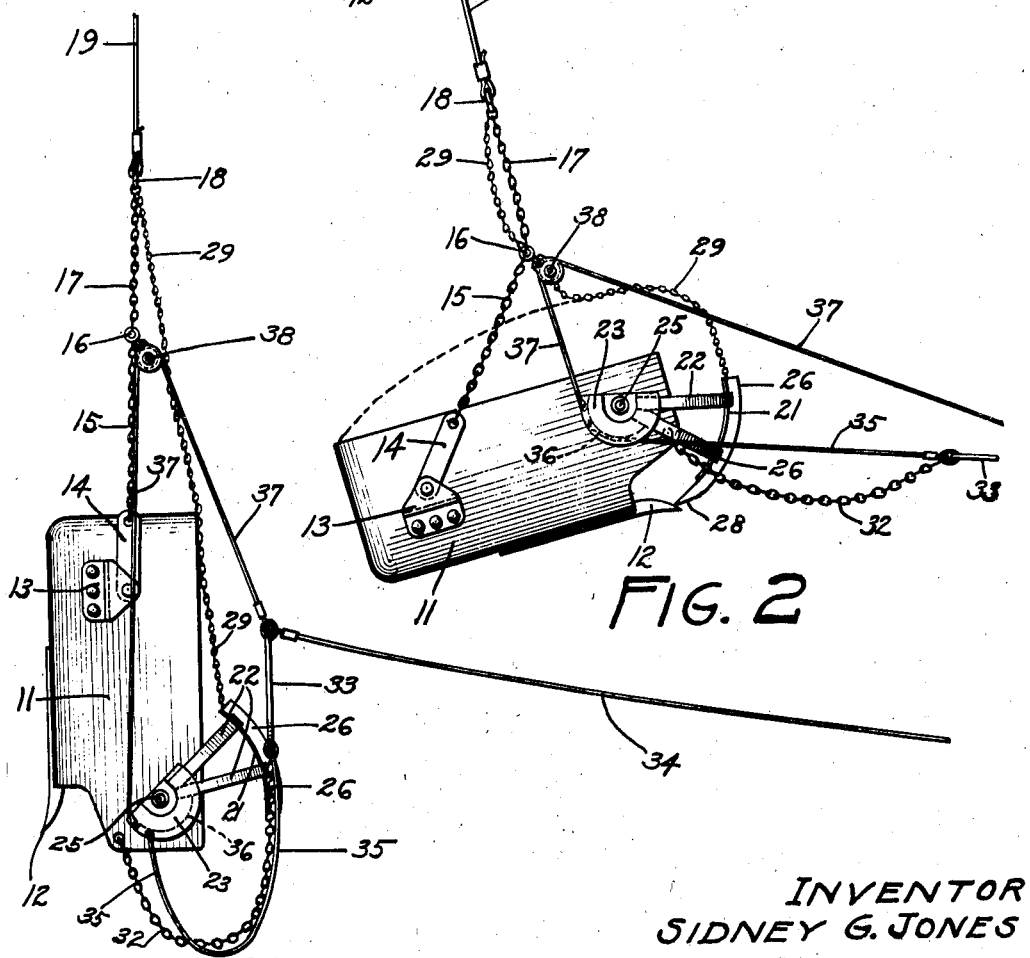

S. G. JONES

DRAG LINE BUCKET

Filed Dec. 22, 1923

INVENTOR
SIDNEY G. JONES
ATTORNEYS

Patented July 28, 1925.

1,547,758

UNITED STATES PATENT OFFICE.

SIDNEY G. JONES, OF MINNEAPOLIS, MINNESOTA.

DRAG-LINE BUCKET.

Application filed December 22, 1923. Serial No. 682,242.

*To all whom it may concern:*

Be it known that I, SIDNEY G. JONES, a citizen of the United States, residing at Minneapolis, county of Hennepin, and State of Minnesota, have invented certain new and useful Improvements in Drag-Line Buckets, of which the following is a specification.

This invention relates to improvements in hoisting and excavating buckets and more particularly relates to that type commonly known as drag-line buckets, which are loaded with the material to be removed by dragging the bucket into the material by means of an ordinary drag-line derrick.

The particular object of this invention is to provide a bucket of this character having a gate or closing means provided at the forward or loading end thereof, for the purpose of preventing the material from dropping out while being transported, thereby increasing the capacity of the bucket which will result in expediting the transportation of the material and thus reduce the cost of doing the work.

A further object is to provide a drag-line bucket, having a gate provided at the forward end thereof adapted to automatically open and close each time the bucket is loaded and unloaded, without requiring any attention on the part of the operator.

A further object is to provide an improved gate or closing means of simple and inexpensive construction, which will be positive in its action, and also one which may readily be attached to drag-line buckets, of ordinary construction.

Other objects of the invention will more fully appear from the following description and the accompanying drawings, and will be pointed out in the annexed claims.

In the drawings there has been disclosed a structure designed to carry out the various objects of the invention, but it is to be understood that the invention is not confined to the exact features shown, as various changes may be made within the scope of the claims which follow.

In the accompanying drawings forming part of this specification—

Figure 1 is a view in side elevation of a drag-line bucket in loading position, showing my invention applied thereto;

Figure 2 is a similar view showing the bucket in loaded position;

Figure 3 is a view showing the bucket in unloading position;

Figure 5:
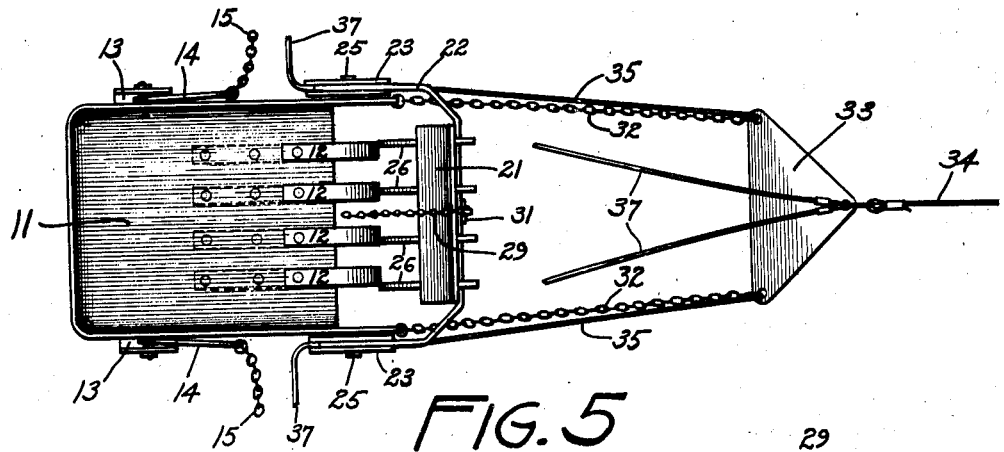
Figure 5 is a plan view of Figure 1 with the lifting mechanism partially broken away and showing the gate in closed position.

In the selected embodiment of the invention here shown, there is illustrated a drag-line bucket 11, of ordinary construction, having the usual cutting lips or teeth 12 provided at the forward end thereof, as shown. Suitable brackets 13 are secured to the side walls of the bucket adjacent the rear end thereof, and preferably have links 14 pivotally connected thereto, to which a suitable lifting means, such as the chains 15, are connected. The upper ends of these chains are suitably connected to a spreader bar 16, and a pair of similar chains 17 have their lower ends similarly connected to the spreader bar, the other ends thereof being terminally connected to a suitable lifting ring or loop 18, to which the usual lifting cable 19 is secured in the usual manner. This cable is usually supported by means of the usual derrick boom, one end thereof being connected to the usual lifting drum mounted on the derrick and which I have not shown as it forms no part of the present invention.

The important feature of this invention resides in the novel means provided for automatically closing the forward or loading end of the bucket each time it has been loaded and is being elevated to transport the material to the desired place. Such means are provided for the purpose of preventing the material from falling out of the forward end of the bucket while being transported, and, is therefore primarily for the purpose of increasing the capacity and efficiency of the bucket.

Such means consists preferably in the provision of a pivotally mounted gate or closing member at the forward end of the bucket. This gate is preferably composed of an arcuately formed plate 21 secured to a pair of suitable bail members 22 which preferably have their ends secured together at each side of the bucket by means of suitable cranks 23. The members 22 may be made of a solid sheet of metal of any suitable shape or size. The cranks 23 may be constructed of plates as shown, or they may be forged or cast, as desired. Apertures 24 are provided in the cranks 23 adapted to receive suitable pivot pins 25, secured to the side walls of the bucket adjacent the forward end thereof.

Figures 4, 6, 7:
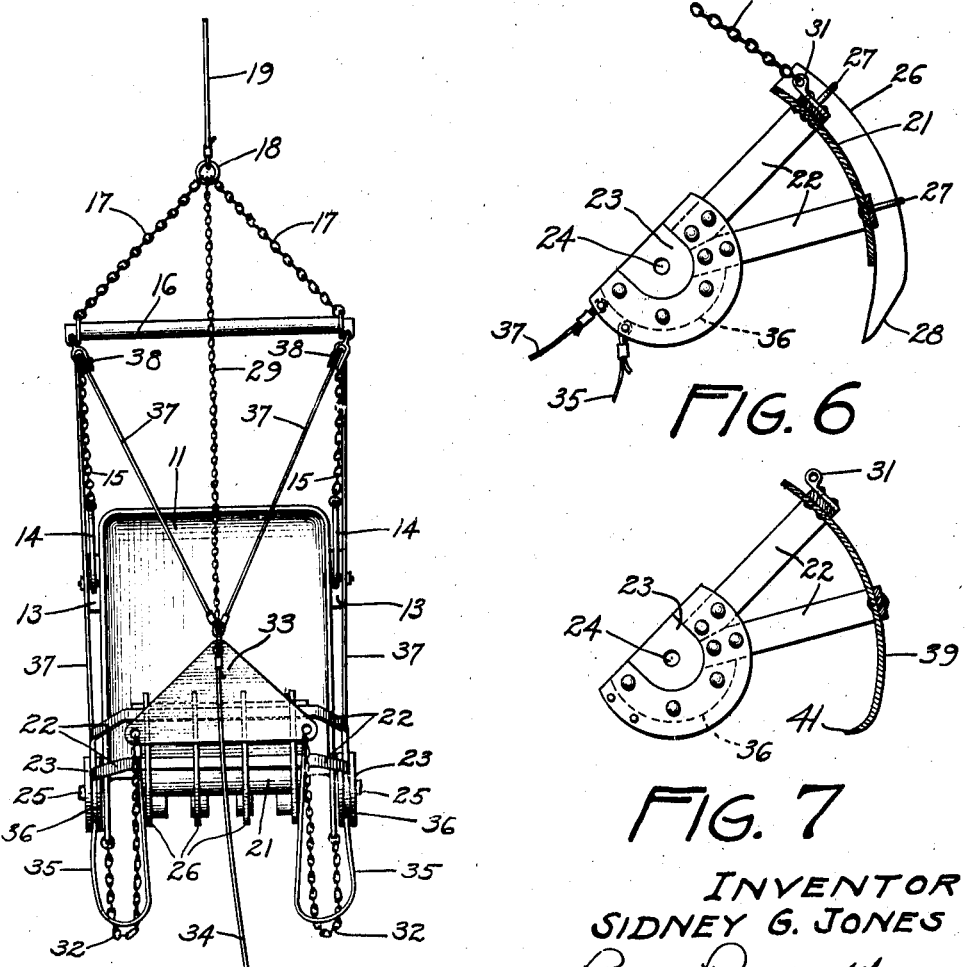
Figure 4 is a front view of Figure 3.
Figure 6 is a view showing the gate removed from the bucket.
Figure 7 is a similar view showing a gate of modified construction.

In general practice it has been found desirable to provide teeth or pick-up fingers 26 on the gate, as shown in the drawings, and particularly in Figure 6. These fingers are preferably formed to fit the outer curved surface of the plate 21 and are secured thereto by suitable means, such as the U-bolts or rivets 27. The lower ends of the fingers 26 are preferably pointed, as indicated at 28, in order that they may more readily dig into the material to be moved when the gate is closed. A flexible cable or chain 29 has one end connected to the upper central portion of the gate by means of a suitable bracket 31, secured thereto, and has its other end connected to the lifting loop or ring 18, as clearly shown in Figure 4. This chain functions to automatically open the gate each time the bucket is unloaded, or when positioned as shown in Figures 3 and 4.

Suitable loading cables or chains 32 are connected to each side of the bucket in the usual manner, and the other ends thereof are preferably connected to a suitable spreader plate 33, preferably triangular in form, which has the usual drag-line cable 34 secured thereto, as shown in Figures 1 and 2. A suitable gate-opening cable or chain 35 is provided at each side of the bucket. These cables preferably have their forward ends secured to the spreader plate 33 and their rear ends to the rear portion of the cranks 23, as clearly shown in Figure 6. As here shown, each crank 23 is preferably provided with a groove or recess 36 adapted to receive its complementary cable 35, when the bucket is loaded and the gate positioned as shown in Figure 2.

A pair of similar cables 37 are similarly connected to the cranks 23, adjacent the cables 35, and upwardly pass therefrom over a suitable supporting means such as a pair of sheaves 38, of ordinary construction, from which they extend forwardly and preferably have their other ends suitably secured to the loop connected to the forward portion of the spreader plate 33. These cables function to close the gate each time the bucket is lifted to transport the material.

In Figure 7 there is shown a modified gate construction, wherein the teeth or pick-up fingers 26 have been eliminated. In this construction a curved plate 39 is secured to the arched frame members 22, and extends downwardly therefrom a suitable distance so as to engage the cutting lips or teeth 12 of the bucket, when the gate is closed. The lower marginal edge 41 of the plate 39, is preferably inwardly curved and sharpened, as shown, so as to provide a better means for supporting the material when transporting it from one place to another.

In using a drag-line bucket equipped with the novel closing means featured in this invention, the bucket will be lowered by gravity, from the position shown in Figure 3, onto the ground or material to be moved. Such lowering of the bucket is accomplished in the usual manner by releasing the lifting cable 19. In the above figure it will be noted that the gate is open, being held in such position by means of the chain 29. Thus, when the bucket is lowered the upper forward end portion thereof will strike the ground causing it to tilt backwards into loading position, as shown in Figure 1, the gate assuming a closed position, as indicated by the dotted lines, owing to the slack in the lifting cable 19, and therefore the chain 29. The usual loading drum of the derrick, (not shown), is then started, resulting in the loading or drag-line cable 34 being drawn taut. As the cable 34 is thus tightened the gate-opening cables 35 will also be put under tension, thereby causing the gate to oscillate upon the pivot pins 25 until it assumes the position, shown in full lines in Figure 1. As soon as the gate has thus been automatically opened, the slack will be out of the loading cables 32, as shown, and the bucket will be drawn forwardly into the material to be loaded.

When the bucket has been sufficiently filled or loaded, the lifting cable 19 will be raised, causing the gate-closing cables 37 to be drawn taut with the resultant closing of the gate, as shown in Figure 2. Further upward movement of the cable 19 will cause the lifting chains 15 and 17 to be drawn taut, causing the bucket to be elevated in the above figure. While the bucket is thus being elevated, the loading cable 34 will be kept taut, as shown, thereby causing the bucket to be suspended by the cable 19, the forward end portion thereof being held in elevated position by means of the cables 37 passing over the sheaves 38 and being in connection with the loading cable 34. When thus positioned the loading chains 32, gate-closing cables 35 and the gate-opening chain 29 will have no function. As soon as it is desired to unload the bucket, the loading cable 34 will be released, causing the bucket to swing downwardly to the position shown in Figure 3, resulting in the material being discharged therefrom. When in this position, the gate will automatically assume an open position, the downward movement of the bucket causing the chain 29 to be drawn taut.

Thus, it will readily be seen that this bucket may be loaded and unloaded as an ordinary bucket, as no additional cables or means are required to open and close the gate, it operating automatically each time the bucket is loaded and unloaded. Also by the provision of such a gate on a drag-line bucket, a greater load may be handled than has been possible with buckets of ordinary construction. It may also be employed as a means for pulling stumps and transporting logs, as the pick-up fingers 26 of the gate will firmly grip anything which might enter between them and the teeth 12 of the bucket. By referring to Figure 2 it will readily be seen and understood that the more tension there is applied to the cables 19 and 34, the harder the fingers 26 will be forced against the teeth 12 of the bucket, thereby providing a simple and efficient means for transporting materials of various characters.

I claim as my invention:

1. The combination with a bucket, of a gate normally closing its discharge opening, drag and lifting cables for said bucket, said drag cable having a direct connection to said bucket, means for opening said gate when the initial pull is applied to said drag-line, subsequent pull on said line being through said direct connection to said bucket.

2. The combination with an excavating bucket, of a gate normally closing its discharge opening, drag and lifting cables for said bucket, the former having a direct connection with said bucket, means for opening said gate when a pull is applied to said drag line preliminary to filling the bucket, means for closing said gate when a pull is applied to said lifting cable, said closing means holding said gate in its closed position when said lifting cable is under tension against the pull of said opening means and said drag line.

3. The combination with an excavating bucket, of a gate normally closing its discharge opening and adapted to swing to an open position in the rear of said opening, drag and lifting cables for said bucket, flexible means connecting said drag line with said gate and adapted to open said gate on the initial pull of said drag line and flexible means connecting said lifting cable with said gate and adapted to move said gate to its closed position when a pull is applied to said lifting cable to lift the filled bucket.

4. The combination with a bucket, of a gate normally closing its discharge opening, drag and lifting cables for said bucket, means for opening said gate when an initial pull is applied to said drag line, means for closing said gate when a pull is applied to said lifting cable to raise the loaded bucket, the connection of said lifting cable with said bucket allowing it to tilt to discharge its load when said drag line is released, and means for opening said gate while said bucket is being tilted to its discharging position.

5. The combination with an excavating bucket, of a gate pivoted thereon at one end and adapted to close the discharge opening in said bucket, said gate having cranks thereon, drag and lifting lines for said bucket, flexible means connecting said drag line with said cranks for opening said gate when an initial pull is applied to said drag line, and flexible means connected with said drag line and having a running connection with said lifting cable, and connected to said cranks for positively closing said gate and holding it in its closed position when a pull is applied to said lifting cable to raise the filled bucket.

6. The combination with an excavating bucket, of a gate normally closing its discharge opening, a drag line connected with said bucket, flexible means connecting said gate with said drag line and adapted to be put under tension to open said gate upon the initial pull of said drag line, said means becoming slack when said gate is open and permitting the direct pull of said drag line upon said bucket.

7. The combination with an excavating bucket, of a gate for closing its discharge opening, a drag line connected with said bucket, a lifting cable connected with said bucket, and flexible means connecting said gate with said lifting cable for positively closing said gate when a pull is applied to said cable to lift said bucket.

8. The combination with an excavating bucket, of a gate pivoted on the forward portion thereof for closing its discharge opening, a lifting cable connected with the rear portion of said bucket, a drag line connected to the forward portion of said bucket, means connected with said lifting and drag lines and attached to said gate eccentric to the pivots thereof for opening said gate upon the initial pull of said drag line and positively closing said gate when a pull is applied to said lifting cable to raise said bucket.

9. The combination with an excavating bucket, of a gate pivoted thereon, a drag line, a spreader connected to said drag line, flexible means connecting said spreader with the opposite sides of said bucket, a lifting cable connected with the rear portion of said bucket, said gate having cranks thereon, flexible means having a running connection with said lifting cable and attached to said cranks and connected to said drag line, the initial pull on said drag line drawing upon said flexible means and swinging said gate to its open position, subsequent pull of said drag line being transmitted through its connections direct to said bucket.

10. The combination with an excavating bucket and a gate pivoted thereon, of drag and lifting cables for said bucket, a spreader connected to said drag cable and having a direct flexible connection with said bucket, and means connected with said drag cable for opening said gate upon the initial pull of said cable.

11. The combination with a bucket, of a gate normally closing its discharge opening, drag and lifting cables for said bucket, flexible means connecting said drag cable with said gate for swinging it to an open position upon the initial pull of said drag cable, flexible means connecting said gate with said lifting cable for swinging said gate to its closed position when said bucket is lifted, and flexible means connecting said gate with said lifting cable for swinging said gate to its open position when said drag cable is loosened to allow tilting of said bucket to its discharging position.

12. The combination with an excavating bucket, of a gate pivoted thereon, semi-circular cranks disks mounted on said gate to oscillate therewith, a drag cable, flexible means connecting said drag cable with said crank disks for swinging said gate to its open position upon the initial pull of said drag cable, and means connecting said drag cable with said bucket to become operative when said gate is swung to an open position.

13. The combination with an excavating bucket, of a gate pivoted thereon, cranks mounted on said gate, a drag cable having a flexible connection with said bucket, means for opening said gate upon the initial pull of said drag cable, a lifting cable connected with the rear portion of said bucket, and flexible means connected to said bucket cranks and having a running connection with said lifting cable and connected to said draft cable for positively closing said gate when said lifting cable is tightened to raise the bucket.

In witness whereof, I have hereunto set my hand this 28th day of November, 1923.

SIDNEY G. JONES.